United States Patent
Moffitt

(10) Patent No.: US 9,720,079 B2
(45) Date of Patent: Aug. 1, 2017

(54) SYSTEM AND METHOD OF MONITORING TRANSPONDER TRANSMISSIONS

(71) Applicant: Bill Moffitt, Rowlett, TX (US)

(72) Inventor: Bill Moffitt, Rowlett, TX (US)

(73) Assignee: NavWorx Incorporated, Rowlett, TX (US)

( * ) Notice: Subject to any disclaimer, the term of this patent is extended or adjusted under 35 U.S.C. 154(b) by 303 days.

(21) Appl. No.: 14/454,544

(22) Filed: Aug. 7, 2014

(65) Prior Publication Data

US 2015/0042504 A1    Feb. 12, 2015

Related U.S. Application Data

(60) Provisional application No. 61/863,592, filed on Aug. 8, 2013.

(51) Int. Cl.
  *G01S 13/75* (2006.01)
  *G01S 13/78* (2006.01)
  *G01S 7/40* (2006.01)

(52) U.S. Cl.
  CPC ............. *G01S 13/781* (2013.01); *G01S 7/40* (2013.01)

(58) Field of Classification Search
  CPC .................................. G01S 13/781; G01S 7/40
  USPC ........................................................... 342/32
  See application file for complete search history.

(56) References Cited

U.S. PATENT DOCUMENTS

| | | | |
|---|---|---|---|
| 4,017,856 A | 4/1977 | Wiegand | |
| 4,970,510 A | 11/1990 | Stelling | |
| 5,262,787 A | 11/1993 | Wilson et al. | |
| 5,278,571 A | 1/1994 | Helfrick | |
| 5,388,047 A | 2/1995 | Ryan et al. | |
| 5,394,152 A * | 2/1995 | Pieronek | G01S 13/76 342/195 |
| 5,446,462 A | 8/1995 | Cleveland | |
| 5,523,750 A | 6/1996 | de Vall | |
| 6,259,380 B1 * | 7/2001 | Jensen | G01C 5/005 340/945 |
| 6,789,016 B2 | 9/2004 | Bayh et al. | |
| 7,598,905 B2 | 10/2009 | Stayton et al. | |
| 7,639,174 B2 | 12/2009 | Kamimura | |
| 7,705,770 B2 | 4/2010 | Wahl | |
| 2001/0047230 A1 * | 11/2001 | Gremmert | G01C 25/00 701/4 |
| 2009/0237290 A1 | 9/2009 | Kishinevsky | |
| 2011/0001653 A1 * | 1/2011 | Troxel | H04L 25/062 342/30 |
| 2012/0038501 A1 * | 2/2012 | Schulte | G01S 13/782 342/30 |

(Continued)

*Primary Examiner* — Timothy A Brainard

(74) *Attorney, Agent, or Firm* — Kirby B. Drake; Klemchuk LLP

(57) ABSTRACT

Transponder transmissions may be monitored through a direct, shielded connection of an RF coupler to a transponder antenna cable. The RF coupler may be added on an antenna cable of an older-style transponder to pick up altitude and reply codes, decode the information and transmit it digitally for use by a separate external monitor. As such, the pilot may be afforded the ability to monitor the older-style transponder's altitude and reply code transmissions to air traffic control so as to determine if a failure of the transponder has occurred. By having the direct connection between RF coupler and the transponder antenna cable, no transmissions of other transponders would be received.

20 Claims, 4 Drawing Sheets

(56) References Cited

U.S. PATENT DOCUMENTS

2012/0200460 A1* 8/2012 Weed .................... B64D 45/00
 342/385
2014/0197980 A1* 7/2014 Schulte .................. G01S 13/91
 342/37

* cited by examiner

SYSTEM AND METHOD OF MONITORING TRANSPONDER TRANSMISSIONS

CROSS REFERENCE TO RELATED APPLICATION

This application claims the benefit under 35 U.S.C. §119 (e) of U.S. Provisional Patent Application Ser. No. 61/863,592 filed on Aug. 8, 2013, entitled "System and Method of Monitoring Transponder Transmissions," which is incorporated by reference in its entirety.

FIELD OF THE DISCLOSURE

The present disclosure generally relates to monitoring transponder transmissions without first interrogating the transponder, and more particularly to monitoring transponder transmissions through a direct connection of a shielded RF coupler to a transponder antenna cable.

BACKGROUND

Traditional transponders used in air traffic radar beacon systems (ATCRBS) for air traffic control (ATC) generally operate such that an encoder may be connected to and in communication with a transponder typically mounted in an instrument panel or avionics rack of an aircraft. The transponder may transmit various codes, including Mode A (reply) codes and Mode C (altitude) codes, but, there is not a mechanism to delineate between these codes (i.e., whether a Mode A code is indeed a Mode A code and not a Mode C code).

Several problems arise from the nature of the design of older-style transponders. Transponders generally transmit information about altitude, and a reply code, assigned by ATC, for use by the ATCRBS. The encoder is generally external to the transponder, and most encoders utilize a parallel wiring mechanism to transfer a Gillham encoded altitude to the transponder. However, if one or more of the parallel wires breaks, or the transponder inputs connected to these parallel wires fail, then the transponder (and ultimately the pilot) may be unable to ascertain whether the altitude information being transmitted to ATC is valid. Older-style transponders also generally use all mechanical means for entry of a reply code, and there is no feedback to the pilot as to the reply code that may be transmitted. For example, if the indicator is integral to the mechanical switch, the switch can fail such that the mechanically connected indicator shows the change, but the transponder circuitry would not detect the change of the failed mechanical switch contacts. Accordingly, the ATC system may be burdened when these older-style transponders fail and transmit false altitude and/or reply codes. Modern transponders generally address these problems by being able to capture altitude and reply codes and show them to the operator or by changing the transponder design; however, the majority of aircraft in operation today utilize these older-style transponders.

SUMMARY

Embodiments of the present disclosure may provide a system and method of monitoring of transponder transmissions through a direct, shielded, connection of an RF coupler to a transponder antenna cable. The RF coupler may be added on an antenna cable of an older-style transponder to pick up altitude and reply codes, decode the information and transmit it digitally for use by a separate external monitor. As such, the pilot may be afforded the ability to monitor the older-style transponder's altitude and reply code transmissions to air traffic control so as to determine if a failure of the transponder has occurred. Such an undetected failure may be of front panel switches (i.e., squawk code switches) and a connected (blind) altitude encoder. By having the direct, shielded, connection between RF coupler and the transponder antenna cable, no transmissions of other transponders would be received.

Other embodiments of the present disclosure may provide a system for monitoring transponder transmissions without externally interrogating or self-interrogating the transponder, the system comprising an RF coupler connected to an antenna cable of the transponder through a direct, shielded connection, wherein the RF coupler may monitor the transponder transmissions, decode the altitude, reply code and identity information, and transmit the altitude, reply code and identity information digitally for use by a transceiver. The altitude, reply code and identity information may be transmitted digitally to an external monitor. The external monitor may be selected from the group comprising: an electronic flight information system (EFIS), a multi-function display (MFD), a primary flight display (PFD) and a purpose-built display. The RF coupler may be coupled to the transceiver and the transceiver may be connected to an instrument panel dedicated read-out. The RF coupler may be connected to the transceiver and the transceiver may be connected to an external monitor. The external monitor may be programmed to show the Mode A and Mode C codes transmitted by the RF coupler. When the transceiver is part of an FAA ADS-B system, Mode A and Mode C codes for a traffic target may be displayed from an FAA ADS-B transmitted message. The transponder may transmit both Mode A and Mode C codes in response to being interrogated and data output from the transponder may remain in the same format regardless whether a Mode A or Mode C code is transmitted. The system may further comprise an altitude encoder connected to the RF coupler to cross-check an altitude code received from the transponder to distinguish between a Mode A and a Mode C code. If the altitude code received from the transponder matches what is measured by the altitude encoder, the altitude code received from the transponder may be confirmed as an altitude Mode C code. If the altitude code received from the transponder does not match what the altitude encoder measures, the altitude code received from the transponder may be confirmed as a Mode A code. The system may further comprise a radar mechanism to distinguish Mode A and Mode C codes, wherein the radar mechanism may be programmed to interrogate more Mode A codes than Mode C codes.

Further embodiments of the present disclosure may provide a method for monitoring transponder transmissions without externally interrogating or self-interrogating the transponder, the method comprising using a direct connection between a shielded RF coupler and a transponder antenna cable, monitoring the transponder transmissions, decoding the altitude, reply code and identity information, and digitally transmitting the altitude, reply code and identity information for use by a transceiver. The transponder transmissions may be monitored to identify undetected failures of front panel switches and an altitude encoder. The method may further comprise using an altitude encoder connected to the RF coupler, discerning whether a Mode A or a Mode C code is transmitted by the transponder. The method also may comprise digitally transmitting the altitude, reply code and identity information to an external monitor, the external monitor selected from the group comprising: an electronic flight information system (EFIS), a multi-function display (MFD), a primary flight display (PFD) and a purpose-built display. The method may further comprise coupling the RF coupler to the transceiver; and connecting the transceiver to an instrument panel dedicated read-out. The method also may comprise connecting the RF coupler to the transceiver; and connecting the transceiver to an external monitor programmed to show the Mode A and Mode C codes transmitted by the RF coupler. The method may further comprise displaying Mode A and Mode C codes for a traffic target from an FAA ADS-B transmitted message when the transceiver is part of an FAA ADS-B system.

Additional embodiments of the present disclosure may provide a transponder monitoring device comprising a shielded RF coupler capable of being directly connected to an aircraft's transponder antenna coaxial cable, wherein the shielded RF coupler picks up altitude, reply codes and identity information forming monitoring information, decodes the monitoring information, and digitally transmits the monitoring information digitally for use by a transceiver, wherein the device monitors transponder transmissions without externally interrogating or self-interrogating the transponder.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may allow older-style transponders to have the ability to verify the altitude and reply codes being sent to air traffic control (ATC) without having to be replaced by a modern transponder. More specifically, if an aircraft is equipped with an older-style Mode C transponder, a transponder monitoring device (referred to herein as the TransMon) may be installed as the control input for a transceiver, such as an ADS600-B. The TransMon is a standalone device that may monitor transponder transmissions through a shielded RF coupler connection to an aircraft's transponder antenna coaxial cable. The TransMon device may be attached to the existing transponder antenna coaxial cable of a Mode C transponder to pick up altitude, reply codes and/or identity information, decode the information, and transmit it digitally for use by a transceiver, such as an ADS600-B, or another separate external monitor (e.g., existing EFIS, MFD, PFD or purpose-built display).

It should be appreciated that monitoring of old-style transponders and altitude encoders connected to old-style transponders may be performed in a variety of manners without departing from the present disclosure. These techniques may include, but are not necessarily limited to, direct, simple monitoring; direct, complex monitoring; and indirect, complex monitoring. Each of these techniques may be described in more detail below.

Figure 2A:
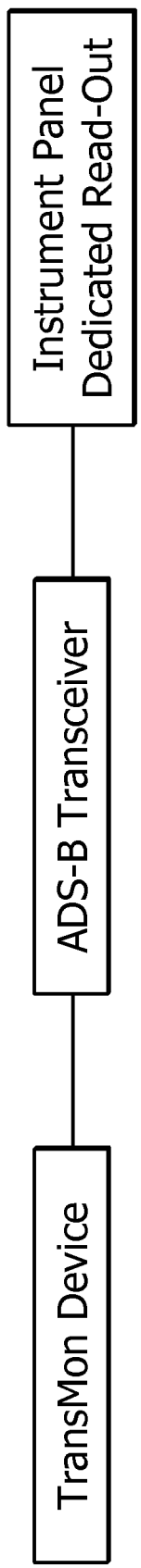
FIG. 2A depicts a direct, simple monitoring mechanism according to an embodiment of the present disclosure.

In an embodiment of the present disclosure, a direct, simple monitoring technique may be employed as depicted in FIG. 2A. Using this technique, the TransMon device may be connected to an ADS-B transceiver, such as an ADS600-B, and the ADS-B transceiver may be connected to an instrument panel dedicated read-out.

Figure 2B:
FIG. 2B depicts a direct, complex monitoring mechanism according to an embodiment of the present disclosure.

In another embodiment of the present disclosure, a direct, complex monitoring technique may be employed as depicted in FIG. 2B wherein the TransMon device may be connected to an ADS-B transceiver, and the ADS-B transceiver may be connected to a multi-function display (MFD), a primary flight display (PFD) or another electronic flight instrument system (EFIS). The MFD, PFD or EFIS may be programmed to show the Mode A and Mode C codes that may be transmitted by the TransMon device according to an embodiment of the present disclosure.

Figure 2C:
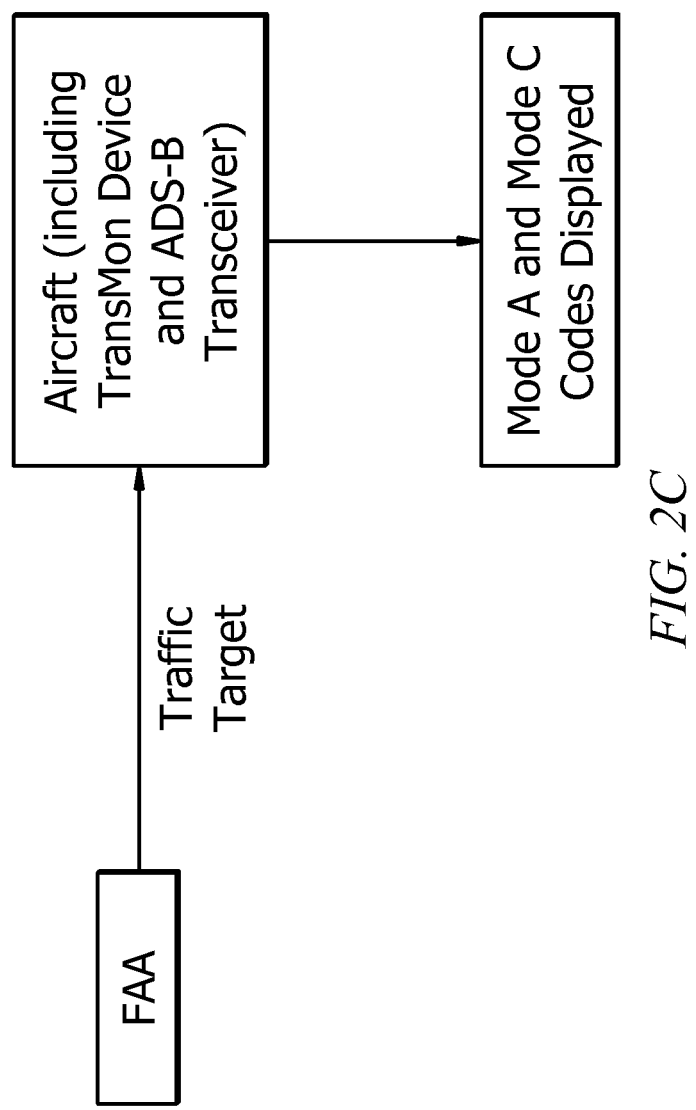
FIG. 2C depicts an indirect, complex monitoring mechanism according to an embodiment of the present disclosure.

In a further embodiment of the present disclosure, an indirect, complex monitoring technique may be employed as depicted in FIG. 2C. This embodiment of the present disclosure takes into account the situation wherein an ADS-B transceiver may form part of an FAA ADS-B system. When the ADS-B transceiver is part of such a system, the FAA may send back traffic targets for ADS-B equipped aircraft. When a TransMon device is employed with the ADS-B transceiver, a traffic target may be received for an aircraft in which the ADS-B transceiver and the TransMon device are installed. Once the traffic target has been received, the associated Mode A and Mode C codes may be displayed from the FAA ADS-B transmitted message, and this information may be presented to a pilot so that he/she may cross-check the information against what is being shown on a transponder.

While various monitoring techniques have been described, it should be appreciated that other monitoring techniques may be utilized without departing from the present disclosure. Further, more or fewer devices/mechanisms may be utilized for monitoring without departing from the present disclosure.

Figure 1:
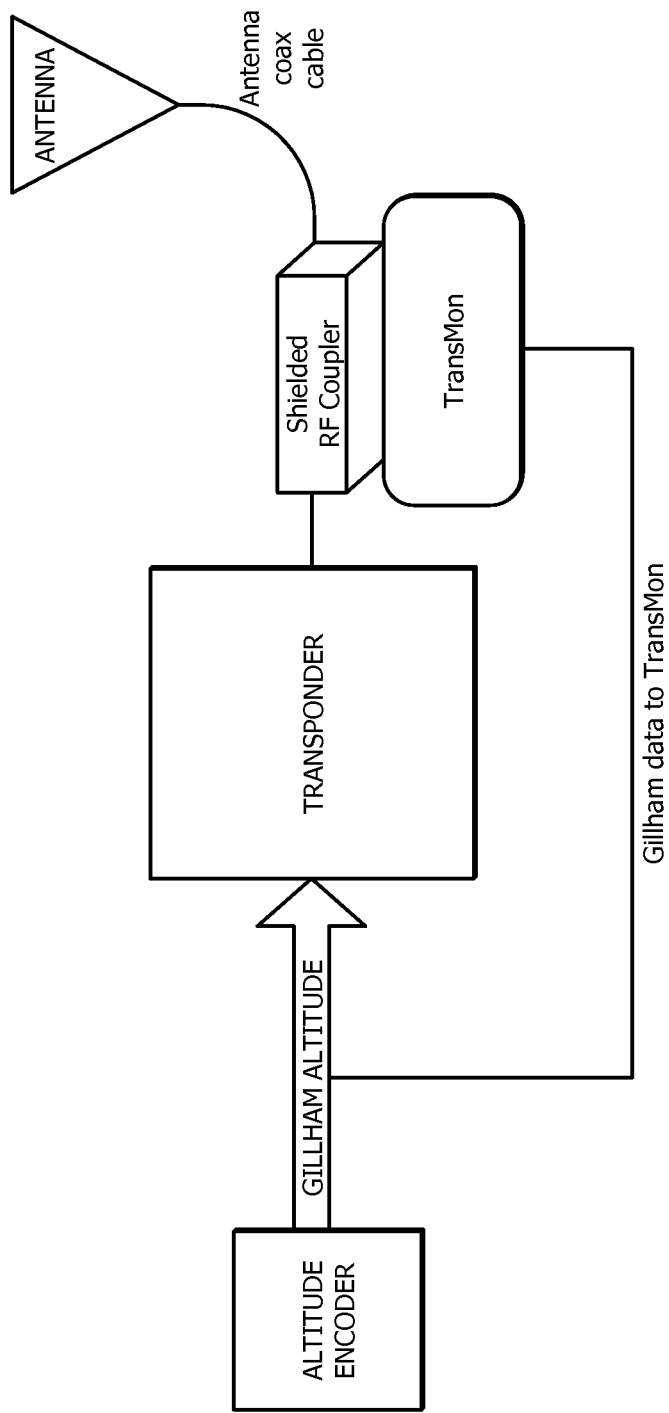
FIG. 1 depicts a system for monitoring transponder transmissions through a direct connection of an RF coupler to a transponder antenna cable according to an embodiment of the present disclosure.

A means for monitoring the transponder transmissions according to embodiments of the present disclosure is through use of the TransMon device via a shielded RF coupler as depicted in FIG. 1. Receiving and decoding the timing bits may be accomplished by programmable hardware and/or software. The software may provide the mechanism to transmit the data digitally out of the TransMon device. By virtue of the direct shielded connection of the RF coupler to the transponder antenna cable, no transmissions of other transponders would be received.

In embodiments of the present disclosure, a transponder may transmit both Mode A (reply) and Mode C (altitude) codes in response to it being interrogated. The data output from the transponder may remain in the same format regardless whether the transponder is transmitting reply or altitude codes. To distinguish between reply or altitude codes, one has to know what type of interrogation that the transponder received and is replying to (i.e., Mode A or Mode C). Because the encoder feeds into the transponder as well as into the TransMon device via an RF coupler, it can distinguish whether a Mode A code is actually a Mode A code and not a Mode C code. This may be helpful insofar as when the transponder transmits either a Mode A or C code, the format of the data is the same, but the TransMon device can cross check using the encoder data.

The TransMon device does not listen to what interrogations the transponder is receiving because it would not know if it was intended for this specific transponder or for a transponder on another aircraft. Accordingly, the TransMon device must be clever to distinguish between the altitude code and the reply code and vice versa. Because there is no difference in the output format between the Mode A and the Mode C codes, the TransMon device may determine what is received based on several factors. The TransMon device monitors the data being transmitted by the transponder. The TransMon device may use a shielded "antenna" (wire), acting as an RF coupler, so that only certain transponder transmissions may be received. The TransMon device does not disturb the existing transponder system so it may reduce costs.

In one scenario, various A, B, C, and D bits may be transmitted by the transponder, and as such, 4096 possible codes may be emitted. Mode A (reply) codes may use all 4096 possible codes while Mode C (altitude) codes may require only 1280 codes. In this scenario, any code received by the TransMon device that is not a valid altitude code may be considered a squawk code. The 1280 codes represent altitudes from −1200 to 126,700 in 100-foot increments [126,700−(−1200)=128,000/100=1280]. Certain ADS-B products (such as the Universal Access Transceivers [UAT]) can only be used up to a certain altitude (such as 18,000 feet). Accordingly, the altitude codes may be limited to those that would realistically be transmitted by the transponder, when a UAT ADS-B device is installed in an aircraft, so 1280 codes may be limited to 212 codes that may represent −1200 up to 20,000 feet [20,000−(−1200)=21,200/100=212]. The final determinate to distinguish whether the transponder code is a squawk or an altitude code is to cross-check against the aircraft's altitude encoder. The Federal Aviation Administration (FAA) requires that both the transponder and ADS-B radios utilize the same altitude encoder. If the transponder code has not been ruled to be a squawk code by the above procedures, then a check of the altitude encoder against the code should identify whether it is an altitude code (i.e., it matches) or a squawk code (i.e., does not match). By using these procedures, the FAA may be more likely to certify the TransMon device.

In another embodiment of the present disclosure, the output of the altitude encoder may be used to cross check to ensure that the Mode A code is indeed the Mode A code and not a C code that maps to an A code.

It should be appreciated that embodiments of the present disclosure may provide the ability to discern a Mode A from a Mode C code without interrogating the transponder. This is a departure from previous devices that may interrogate a transponder in order to discern the Mode A or Mode C code received from the transponder.

It also should be appreciated that different methods may be used to discern the Mode A (squawk) from the Mode C (altitude) codes, including using the altitude encoder connected to a TransMon device to cross-check the altitude code coming from the received reply. If the altitude code matches with what the altitude encoder has read, then the code received is identified as an altitude Mode C reply code, and any different code would be confirmed as a squawk Mode A reply code. However, in some embodiments of the present disclosure, the altitude encoder cross-check mode may be eliminated but the two reply codes may still be accurately discerned. This may save the cost of installing a device to monitor the altitude encoder by the TransMon device in certain aircraft. In another method, the two codes may be discerned by understanding how radars work. Radars are all programmed to interrogate more Mode A reply codes than Mode C reply codes. Using this information, if two different reply codes both map to an altitude, and an altitude cross-check is not used, then a situation may arise wherein the correct Mode A may not be discerned from the Mode C. However, by knowing that the radar interrogates Mode A more times than Mode C, the reply codes may be accurately identified.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system for monitoring transponder transmissions without externally interrogating or self-interrogating the transponder, the system comprising:
    an RF coupler connected to an antenna cable of the transponder through a direct, shielded connection,
        wherein the RF coupler monitors the transponder transmissions, decodes the altitude, reply code and identity information, and transmits the altitude, reply code and identity information digitally for use by a transceiver,
        wherein the transponder is a standalone transponder, and
        wherein the system does not disturb existing transponder systems; and
    an altitude encoder connected to the RF coupler to cross-check an altitude code received from the transponder.

2. The system of claim 1 wherein the altitude, reply code and identity information is transmitted digitally to an external monitor.

3. The system of claim 2 wherein the external monitor is selected from the group comprising:
    an electronic flight information system (EFIS), a multi-function display (MFD), a primary flight display (PFD) and a purpose-built display.

4. The system of claim 1 wherein the RF coupler is coupled to the transceiver and the transceiver is connected to an instrument panel dedicated read-out.

5. The system of claim 1 wherein the RF coupler is connected to the transceiver and the transceiver is connected to an external monitor.

6. The system of claim 5 wherein the external monitor is programmed to show the Mode A and Mode C codes transmitted by the RF coupler.

7. The system of claim 1 wherein when the transceiver is part of a surveillance system, Mode A and Mode C codes for a traffic target are displayed from a transmitted message of the surveillance system.

8. The system of claim 1 wherein the transponder transmits both Mode A and Mode C codes in response to being interrogated and data output from the transponder remains in the same format regardless whether a Mode A or Mode C code is transmitted.

9. The system of claim 1 wherein the altitude encoder connected to the RF coupler distinguishes between a Mode A and a Mode C code.

10. The system of claim 9 wherein if the altitude code received from the transponder matches what is measured by the altitude encoder, the altitude code received from the transponder is confirmed as an altitude Mode C code.

11. The system of claim 9 wherein if the altitude code received from the transponder does not match what is measured by the altitude encoder, the altitude code received from the transponder is confirmed as a Mode A code.

12. The system of claim 1 further comprising:
a radar mechanism to distinguish Mode A and Mode C codes, wherein the radar mechanism is programmed to interrogate more Mode A codes than Mode C codes.

13. A method for monitoring transponder transmissions without externally interrogating or self-interrogating the transponder, the method comprising:
using a direct connection between a shielded RF coupler and a transponder antenna cable,
monitoring the transponder transmissions,
decoding the altitude, reply code and identity information, and
digitally transmitting the altitude, reply code and identity information for use by a transceiver,
wherein the transponder is a standalone transponder, and
wherein the system does not disturb existing transponder systems; and
connecting an altitude encoder to the RF coupler and cross-checking an altitude code received from the transponder.

14. The method of claim 13 wherein the transponder transmissions are monitored to identify undetected failures of front panel switches and an altitude encoder.

15. The method of claim 13 further comprising:
using the altitude encoder connected to the RF coupler, discerning whether a Mode A or a Mode C code is transmitted by the transponder.

16. The method of claim 13 further comprising:
digitally transmitting the altitude, reply code and identity information to an external monitor, the external monitor selected from the group comprising:
an electronic flight information system (EFIS), a multi-function display (MFD), a primary flight display (PFD) and a purpose-built display.

17. The method of claim 13 further comprising:
coupling the RF coupler to the transceiver; and
connecting the transceiver to an instrument panel dedicated read-out.

18. The method of claim 13 further comprising:
connecting the RF coupler to the transceiver; and
connecting the transceiver to an external monitor programmed to show the Mode A and Mode C codes transmitted by the RF coupler.

19. The method of claim 13 further comprising:
displaying Mode A and Mode C codes for a traffic target from a transmitted message of the surveillance system when the transceiver is part of a surveillance system.

20. A transponder monitoring device comprising:
a shielded RF coupler capable of being directly connected to an aircraft's transponder antenna coaxial cable, wherein the shielded RF coupler picks up altitude, reply codes and identity information forming monitoring information, decodes the monitoring information, and digitally transmits the monitoring information digitally for use by a transceiver,
wherein the device monitors transponder transmissions without externally interrogating or self-interrogating the transponder,
wherein the transponder is a standalone transponder, and
wherein the system does not disturb existing transponder systems; and
an altitude encoder connected to the RF coupler to cross-check an altitude code received from the transponder.

* * * * *